(12) United States Patent
Matsuzawa et al.

(10) Patent No.: US 9,815,337 B2
(45) Date of Patent: Nov. 14, 2017

(54) PNEUMATIC TIRE

(71) Applicant: BRIDGESTONE CORPORATION, Tokyo (JP)

(72) Inventors: Kazutaka Matsuzawa, Gilbert, AZ (US); Shun Ogane, Kodaira (JP); Yuki Kawakami, Pomezia (IT)

(73) Assignee: BRIDGESTONE CORPORATION, Tokyo (JP)

( * ) Notice: Subject to any disclaimer, the term of this patent is extended or adjusted under 35 U.S.C. 154(b) by 378 days.

(21) Appl. No.: 14/412,518

(22) PCT Filed: Jul. 4, 2013

(86) PCT No.: PCT/JP2013/068350
§ 371 (c)(1),
(2) Date: Jan. 2, 2015

(87) PCT Pub. No.: WO2014/007321
PCT Pub. Date: Jan. 9, 2014

(65) Prior Publication Data
US 2015/0151590 A1 Jun. 4, 2015

(30) Foreign Application Priority Data
Jul. 4, 2012 (JP) ................... 2012-150945

(51) Int. Cl.
*B60C 11/00* (2006.01)
*B60C 11/13* (2006.01)
(Continued)

(52) U.S. Cl.
CPC ...... *B60C 11/1369* (2013.01); *B60C 11/0302* (2013.01); *B60C 11/0304* (2013.01);
(Continued)

(58) Field of Classification Search
CPC .................................................. B60C 11/1396
(Continued)

(56) References Cited

U.S. PATENT DOCUMENTS

| 3,727,661 A | 4/1973 | Hoke |
| 2002/0112801 A1 | 8/2002 | Matsumoto |

(Continued)

FOREIGN PATENT DOCUMENTS

| EP | 1 568 514 A1 | 8/2005 |
| EP | 2 851 211 A1 | 3/2015 |

(Continued)

OTHER PUBLICATIONS

JPO machine translation of JP 2004-224268, retrieved Mar. 9, 2017.*

(Continued)

*Primary Examiner* — Timothy Kennedy
(74) *Attorney, Agent, or Firm* — Sughrue Mion, PLLC

(57) ABSTRACT

A tire is a tire in which circumferential grooves, and lug grooves comprising opening portion in tread end and which extend in the tread width direction from the tread end to the circumferential groove, are formed. Projection parts are provided in the groove bottom of the circumferential grooves. The projection parts extend from one side wall forming a circumferential groove to the other side wall opposite the one side wall. Multiple lug grooves are formed at predetermined intervals in the circumferential direction. In the tread surface view of the tire, given points of intersection as the points at which a circumferential groove extension that passes through a circumferential groove intersects with a lug groove extension that passes through a lug groove, the projection parts are provided between a first (Continued)

point of intersection and a second point of intersection adjacent to the first point of intersection in the circumferential direction.

11 Claims, 10 Drawing Sheets

(51) Int. Cl.
  *B60C 11/03* (2006.01)
  *B60C 11/04* (2006.01)
(52) U.S. Cl.
  CPC ....... *B60C 11/0306* (2013.01); *B60C 11/0311* (2013.01); *B60C 11/0316* (2013.01); *B60C 11/042* (2013.01); *B60C 2011/0372* (2013.01); *B60C 2011/0388* (2013.01); *B60C 2011/1361* (2013.01); *B60C 2200/065* (2013.01)
(58) Field of Classification Search
  USPC .................................................. 264/209.22
  See application file for complete search history.

(56) References Cited

U.S. PATENT DOCUMENTS

| 2003/0056867 | A1 | 3/2003 | Bettiol et al. |
| 2005/0126670 | A1 | 6/2005 | Godefroid |

FOREIGN PATENT DOCUMENTS

| JP | 63-297108 | A | 12/1988 |
| JP | 03197207 | A | 8/1991 |
| JP | 7-232514 | A | 9/1995 |
| JP | 2002-187411 | A | 7/2002 |
| JP | 2004-224268 | A | 8/2004 |
| JP | 2005053257 | A | 3/2005 |
| JP | 2005-170381 | A | 6/2005 |
| JP | 2007001359 | A | 1/2007 |
| JP | 2009-160994 | A | 7/2009 |
| JP | 2012-86825 | A | 5/2012 |
| KR | 10-2011-0125301 | A | 11/2011 |
| WO | 95/18022 | A1 | 7/1995 |

OTHER PUBLICATIONS

Communication dated May 31, 2016 issued by the Japanese Patent Office in counterpart application No. 2014-233678.
Extended European Search Report issued in European Application No. 13813374.9 dated Jan. 8, 2016.
Decision of Refusal for Japanese Patent Application No. 2013-532389, dated Aug. 19, 2014.
Notification of Reason(s) for Refusal of Japanese Patent Application No. 2013-532389, dated Feb. 25, 2014.
International Search Report of PCT/JP2013/068350, dated Aug. 27, 2013. [PCT/ISA/210].

* cited by examiner

FIG. 7
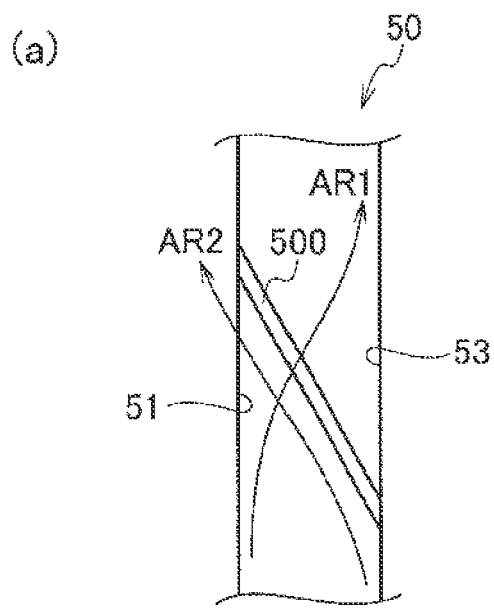
(a)
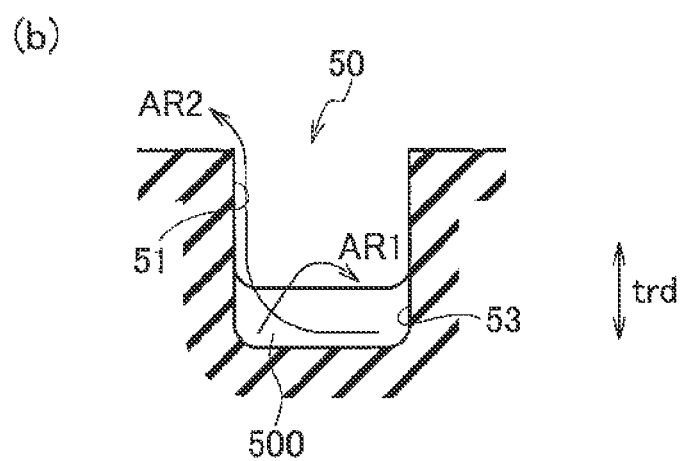
(b)

PNEUMATIC TIRE

CROSS REFERENCE TO RELATED APPLICATIONS

This application is a National Stage of International Application No. PCT/JP2013/068350 filed Jul. 4, 2013, claiming priority based on Japanese Patent Application No. 2012-150945, filed Jul. 4, 2012, the contents of all of which are incorporated herein by reference in their entirety.

Applicants provide herein a Substitute Specification under 37 C.F.R. §1.125(a). In accordance with 37 C.F.R. §1.125(b)(1), the undersigned states that the Substitute Specification contains no new matter. In accordance with 37 C.F.R. §1.125(b)(2), a redline copy of the original specification showing the amendments thereto is attached to this Amendment. In accordance with 37 C.F.R. §1.125(c), a clean copy of the Substitute Specification is attached to this Amendment. No new matter has been added. Entry of the Substitute Specification is requested.

TECHNICAL FIELD

The present invention relates to a tire designed to suppress a temperature rise of the tire during driving.

BACKGROUND ART

Heretofore, pneumatic tires (hereinafter, referred to as tires) to be put on a vehicle have employed various methods for suppressing a temperature rise in the tires during driving of the vehicle. A temperature rise is remarkable in heavy duty tires put on trucks, buses, construction vehicles and the like, in particular.

To address this, there has been known a tire provided with a large number of fin-like projections on a side wall section of the tire (for example, Patent Literature 1). In such a tire, the fin-like projections generate turbulent flows in air flows passing over the surface of the side wall section when the tire is rolling on a road, and heat dissipation from the tire is encouraged by the turbulent flows. Thus, a temperature rise in the side wall section is suppressed.

The aforementioned conventional tire, however, has the following point to be improved. Specifically, provided with the projections on the side wall section, the conventional tire produces the effect of suppressing a temperature rise in the side wall section. However, the conventional tire cannot suppress a temperature rise in the tread section, and is expected to be improved to address such problem.

CITATION LIST

Patent Literature

Patent Literature 1: Japanese Patent Application Publication No. 2009-160994 (pp. 4 and 5, FIG. 2)

SUMMARY OF INVENTION

The present invention has a feature summarized as a tire (tire 1) including: a tread section (tread section 5) including a circumferential groove (circumferential groove 50) formed to extend in a tire circumferential direction, and a lug groove formed to have an opening portion (opening portion 60a) at a tread end (tread end 5e) and to extend in a tread width direction from the tread end to the circumferential groove; and a projection part (projection part 500) provided on a groove bottom (groove bottom 52) of the circumferential groove. In the tire, the projection part extends from one (side wall 51) of side walls forming the circumferential groove to the other side wall (side wall 53) opposed to the one side wall, and multiple lug grooves are formed at a predetermined interval in the tire circumferential direction. In addition, given that an intersection (intersection Pc) is a point where a circumferential groove inner line (for example, a circumferential groove inner line TCL) passing through the inside of the circumferential groove crosses a lug groove inner line (for example, a lug groove inner line WCL) passing through the inside of each of the lug grooves in a tread face view of the tire, the projection part is provided between a first intersection (first intersection Pc1) and a second intersection (second intersection Pc5) next to the first intersection in the tire circumferential direction.

According to the tire of the first feature, given that the intersection is a point where the circumferential groove inner line passing through the inside of the circumferential groove crosses the lug groove inner line passing through the inside of each of the lug grooves in the tread face view of the tire, the projection part is provided between the first intersection and the second intersection next to the first intersection in the tire circumferential direction. Provided with the projection part between the first section and the second section, this tire is able to encourage heat dissipation by disturbing the air stagnation layer inside the circumferential groove, as compared with tires provided with no projection part between the first intersection and the second intersection. That is to say, the tire encourages the heat dissipation from the inside of the circumferential groove, and together can encourage the heat dissipation in the tread section through the heat dissipation from the inside of the circumferential groove.

In the aforementioned feature, the second intersection may be located behind the first intersection in a tire rotation direction, and the projection part may be provided on a second intersection side of a point shifted by PL/4 from the first intersection, where PL denotes an interval between the first intersection and the second intersection.

In the aforementioned feature, the projection part may be provided on a forward side, in a tire rotation direction, of a point shifted by 3PL/4 from the first intersection.

In the aforementioned feature, the circumferential groove may be formed at a position shifted by TW/8 from a tire center line outward in the tread width direction, where TW denotes a width of the tread section in the tread width direction.

In the aforementioned feature, the lug grooves may each extend inclining with respect to the tread width direction in the tread face view of the tire, and an inclination angle of each of the lug grooves with respect to the tread width direction may be 0 degrees to 60 degrees, both inclusive.

In the aforementioned feature, the lug grooves may be formed on one and the other sides of a tire center line in the tread width direction, and the lug grooves formed on the one side in the tread width direction and the lug grooves formed on the other side in the tread width direction may be the same in directionality with respect to the tire rotation direction when viewed from the tire center line to the respective tread ends.

In the aforementioned feature, the lug grooves may be formed on one and the other sides of a tire center line in the tread width direction, and the lug grooves formed on the one side in the tread width direction and the lug grooves formed on the other side in the tread width direction may be different in directionality with respect to the tire rotation direction when viewed from the tire center line to the respective tread ends.

In the aforementioned feature, the projection part may include an upper face portion having a side wall joint portion joined to the one side wall of the circumferential groove, a cross sectional shape of the side wall joint portion in a cross section along the tread width direction may be formed in an arc shape having a curvature radius R1, and the curvature radius R1 may satisfy a relationship of $0.1TWf \leq R1 \leq 0.4TWf$, where TWf denotes a width of the upper face portion.

In the aforementioned feature, the projection part may include side face portions having groove bottom joint portions joined to the groove bottom of the circumferential groove, a cross sectional shape of each of the groove bottom joint portions in a cross section along a width direction of the projection part may be formed in an arc shape having a curvature radius R2, and the curvature radius R2 may satisfy a relationship of $0.1Hf \leq R2 \leq Hf$, where Hf denotes a height of the projection part from the groove bottom.

In the aforementioned feature, multiple projection parts may be provided between the first intersection and the second intersection.

In the aforementioned feature, the number of the lug grooves formed in the tread section on one side of the tire center line in the tread width direction may be 20 to 80, both inclusive.

In the aforementioned feature, the projection part may be provided inclining with respect to the tire circumferential direction.

BRIEF DESCRIPTION OF DRAWINGS

FIG. 7(*a*) is a view illustrating a shape of the circumferential groove 50 in a tread face view. FIG. 7(*b*) is a view illustrating the shape of the circumferential groove 50 viewed from the F5 direction in FIG. 4.

DESCRIPTION OF EMBODIMENTS

An example of a tire according to the present invention will be described with reference to the drawings. Specifically, the following description is provided for (1) Structure outline of Tire 1, (2) Structure outline of Projection Part 500, and (3) Actions and Effects.

In the following description of the drawings, the same or similar reference signs denote the same or similar elements and portions. In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

First Embodiment (1) Structure Outline of Tire 1

Figure 1:
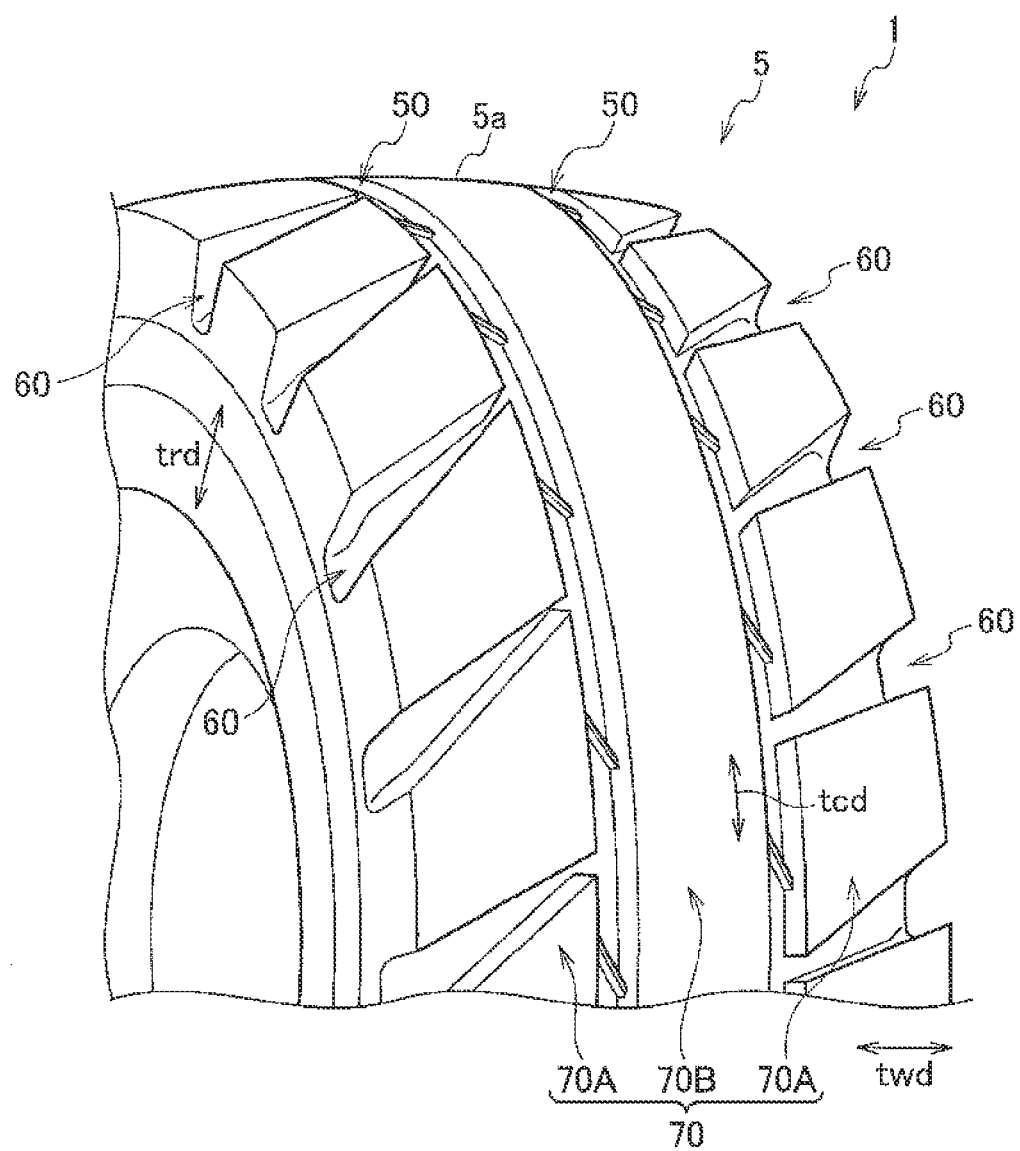
FIG. 1 is a perspective view of a tire 1 according to a first embodiment.
Figure 2:
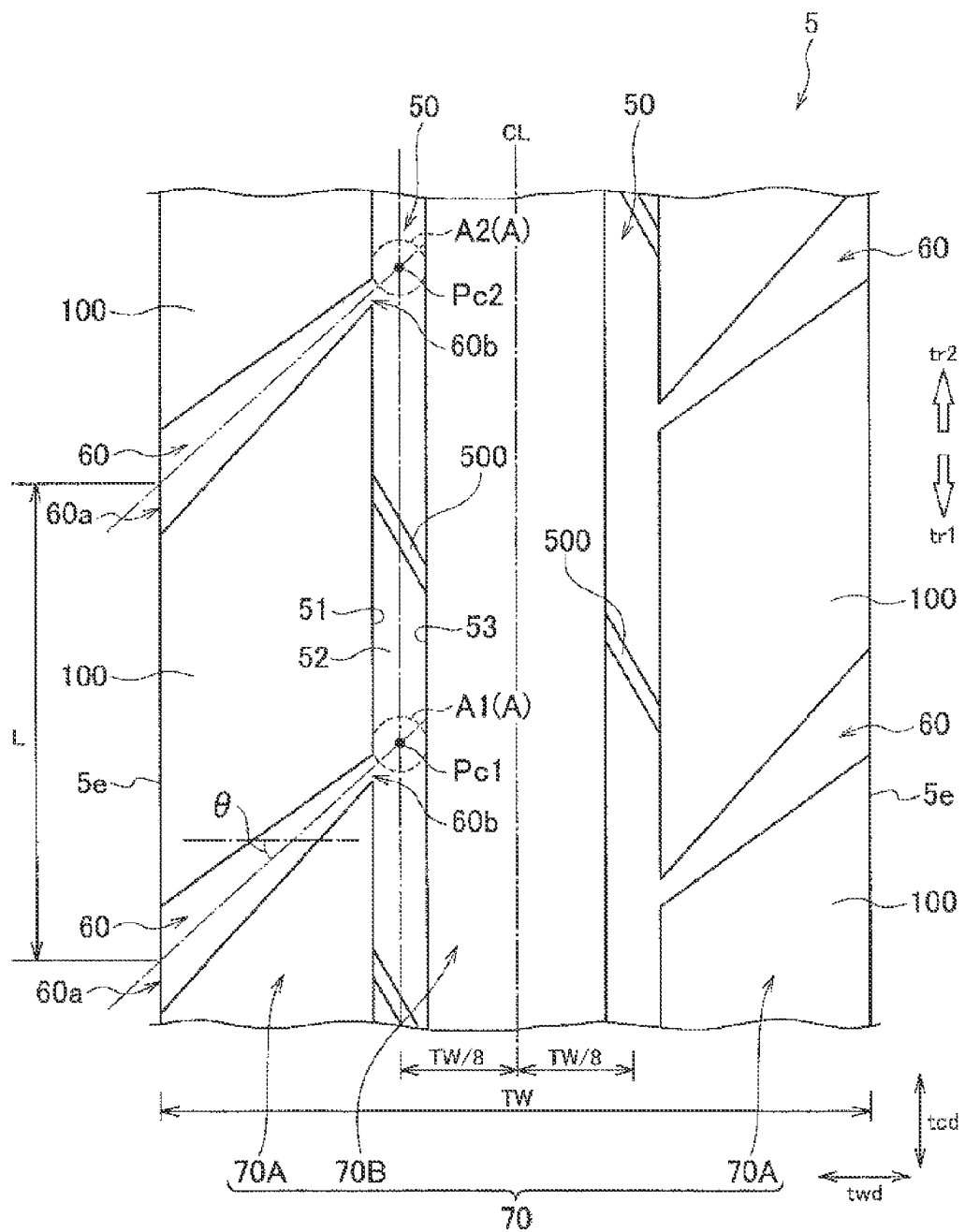
FIG. 2 is a development view of a tread pattern of the tire 1 according to the first embodiment.

With reference to FIGS. 1 and 2, description is provided for a structure outline of a tire 1 according to a first embodiment of the present invention. FIG. 1 is a perspective view of the tire 1 according to this embodiment. FIG. 2 is a development view of a tread pattern of the tire 1 according to this embodiment.

The tire 1 according to this embodiment is assumed as a radial tire having an aspect ratio of 95% or less, a rim diameter of 57" or more, a load capacity of 60 metric ton or more, and a load factor (k-factor) of 1.3 or more. It should be noted that the tire 1 is not limited to this.

The tire 1 is attached to a rim which is a normal rim. The tire 1 has a normal internal pressure and is subjected to a normal load. The rim is provided with a rim flange. Although the tire 1 includes bead sections and side wall sections, the explanation thereof is omitted herein.

For convenience in description, the tire 1 is assumed herein to be put on a vehicle in such a manner that the tire 1 can roll in a rotation direction (tire rotation direction) tr1 when the vehicle moves forward. The rotation direction of the tire 1 in the state of being put on the vehicle is not specifically limited.

Here, the "normal rim" refers to a standard rim in an applied size specified in Year Book 2010 of JATMA (The Japan Automobile Tyre Manufacturers Association, Inc.). In countries other than Japan, the "normal rim" refers to standard rims in applied sizes specified in the following standards.

The "normal internal pressure" refers to a pneumatic pressure defined by a tire measuring method in Year Book 2010 of JATMA (The Japan Automobile Tyre Manufacturers Association, Inc.). In countries other than Japan, the "normal internal pressure" refers to pneumatic pressures equivalent to the pneumatic pressures at the time of measurement of the tire dimensions, which are specified in the following standards.

The "normal load" refers to a load equivalent to a maximum load capability in the case where a single wheel is applied, which is specified in Year Book 2010 of JATMA (The Japan Automobile Tyre Manufacturers Association, Inc.). In countries other than Japan, the "normal load" refers to maximum loads (maximum load capabilities) in single wheels in applied sizes specified in the following standards.

The standards are determined by industrial standards effective in areas where tires are manufactured or used. For example, the standard in United States is "Year Book of The Tire and Rim Association Inc.," and the standard in Europe is "Standards Manual of The European Tire and Rim Technical Organization".

A tread section 5 has a tread face 5a to come into contact with a road surface. The tread section 5 has tread ends 5e that are outer-side ends of the tread section 5 in a tread width direction twd. The tread pattern of the tread section 5 has a shape symmetric with respect to a point on a tire center line CL. Here, the tread ends 5e of the tread section 5 refer to ends of the tread face under the conditions where the tire 1 is in contact with the road face while rolling under the "normal internal pressure" and the "normal load". The conditions where the tire 1 is in contact with the road face are, for example, conditions where the tire 1 is attached to the "normal rim" and is subjected to the "normal pressure" and the "normal load".

The tire 1 is a pneumatic tire. In the tire 1, the tread section 5 may have a lager rubber gauge (rubber thickness) than in pneumatic tires to be put on a passenger cars or the like.

As illustrated in FIGS. 1 and 2, two or more circumferential grooves 50 each extending in a tire circumferential direction tcd and multiple lug grooves 60 (widthwise grooves) are formed in the tread section 5. In addition, multiple circumferential land sections 70 (land sections) defined by the two or more circumferential grooves 50 are formed in the tread section 5.

The two or more circumferential grooves 50 each extend in the tire circumferential direction tcd. The circumferential grooves 50 are respectively formed on one and the other outer sides in the tread width direction twd. In this embodiment, TW denotes a width of the tread section 5 between both ends (tread ends 5e, 5e) in the tread width direction as illustrated in FIG. 2.

As illustrated in FIG. 2, the circumferential grooves 50 are formed at positions shifted from a tire center line CL by TW/8 outward in the tread width direction twd, where TW denotes the width of the tread section 5 in the tread width direction twd.

Although the example in FIG. 2 illustrates the case where the centers of the circumferential grooves 50 in the tread width direction twd are located at the positions shifted from the tire center line CL by TW/8 outward in the tread width direction twd, this is not only the case. For example, it suffices that at least parts of the circumferential grooves 50 be located at the positions shifted from the tire center line CL by TW/8 outward in the tread width direction twd. Moreover, the example in FIG. 2 illustrates the case where two circumferential grooves 50 are formed. However, the tire 1 is not limited to this, but may include three or more circumferential grooves.

Further, the example in FIG. 2 illustrates the case where the circumferential grooves 50 have a shape extending linearly along the tire circumferential direction tcd, but the circumferential grooves 50 may have a shape including bent portions. Here, the shape including a bent portion may be a shape where a groove extends in a zigzag form along the tire circumferential direction tcd, or may be a shape where the groove curves repeatedly while extending in the tire circumferential direction tcd. Note that, in the case where the circumferential groove 50 has a shape including bent portions, the circumferential groove 50 is preferably formed to have one or more bent portions between two lug grooves 60 neighboring in the tire circumferential direction tcd. Moreover, the circumferential groove 50 may extend continuously in the tire circumferential direction tcd, or extend in the tire circumferential direction tcd while having one discontinuous part or a group of discontinuous parts repeatedly arranged therein.

As illustrated in FIG. 2, each of the circumferential grooves 50 includes a one side wall 51, a groove bottom 52, and another side wall 53. In addition, the groove bottom 52 of the circumferential groove 50 is provided with multiple projection parts 500 as described later.

Each of the lug grooves 60 extends from the circumferential groove 50 to the tread ends 5. The lug groove 60 includes an opening portion 60a at the tread end 5e. Thus, the lug groove 60 is opened to the tread end 5e. In the opposite view, the lug groove 60 extends from the tread end 5e to the circumferential groove 50 in the tread width direction twd. An inner-side end of the lug groove 60 in the tread width direction twd is opened to the circumferential groove 50. In other words, the lug groove 60 includes an opening portion 60b opened to the circumferential groove 50.

The multiple lug grooves 60 are formed at predetermined intervals L in the tire circumferential direction tcd. In the tire 1 according to this embodiment, the predetermined interval L is preferably 100 mm to 500 mm, both inclusive.

In a tread face view of the tire 1 according to this embodiment, the lug grooves 60 may extend while inclining with respect to the tread width direction twd. An inclination angle θ of each lug groove 60 with respect to the tread width direction twd is preferably 0 degrees to 60 degrees, both inclusive.

Here, an air flow inside the lug groove 60 is mainly a running wind generated with rolling of the tire 1. As the direction determined by the inclination angle θ of the lug groove 60 becomes closer to the tire circumferential direction tcd, an amount of running wind entering the lug groove 60 increases and accordingly hear dissipation is encouraged. On the other hand, if the direction determined by the inclination angle θ of the lug groove 60 is too close to the tire circumferential direction tcd, the amount of air flow in the groove increases in deed, but land blocks 100 are narrowed in width. This reduces the stiffness of the land blocks 100 and induces deterioration of tire performances such as drivability and abrasion resistance. For these reasons, it is preferable that the inclination angle θ of the lug groove 60 be within the above range. Then, it is more preferable that the inclination angle θ of the lug groove 60 be in a range of 30 degrees to 45 degrees, both inclusive.

In the tire 1 according to this embodiment, the lug grooves 60 are formed on one and the other sides of the tire center line CL in the tread width direction twd.

In the tire 1 according to this embodiment, when viewed from the tire center line CL toward the respective tread ends 5e, the lug grooves 60 formed on the one side in the tread width direction twd and the lug grooves 60 formed on the other side in the tread width direction twd are different in directionality with respect to the rotation directions tr.

To be specific, as illustrated in FIG. 2, in the lug groove 60 formed on one side (the left side) in the tread width direction twd, the direction from the opening portion 60b toward the opening portion 60a extends in a direction closer to the rotation direction tr1 than to the rotation direction tr2. On the other hand, in the lug groove 60 form on the other side (the right side) in the tread width direction twd, the direction from the opening portion 60b toward the opening portion 60a extends in a direction closer to the rotation direction tr2 than to the rotation direction tr1. In short, in the tire 1 according to this embodiment, the tread pattern has non-directionality.

The multiple circumferential land sections 70 each extend along the tire circumferential direction tcd. The multiple circumferential land sections 70 include circumferential land sections 70A, 70B.

The circumferential land sections 70A, 70A are circumferential land sections located on the outermost positions in the tread width direction twd. The circumferential land section 70B is located between the one and the other circumferential land sections 70A, 70A in the tread width direction twd. The circumferential land section 70B is a circumferential land section located on the tire center line CL.

Each circumferential land section 70A is provided with the lug grooves 60 formed therein. The tread section 5 is provided with land blocks 100 defined by the lug grooves 60. In other words, the circumferential land section 70A is divided by the lug grooves 60 to form the land blocks 100.

(2) Structure Outline of Projection Part 500

With reference to FIGS. 3 to 6, description is provided for a structure outline of a projection part 500 according to this embodiment.

Figure 3:
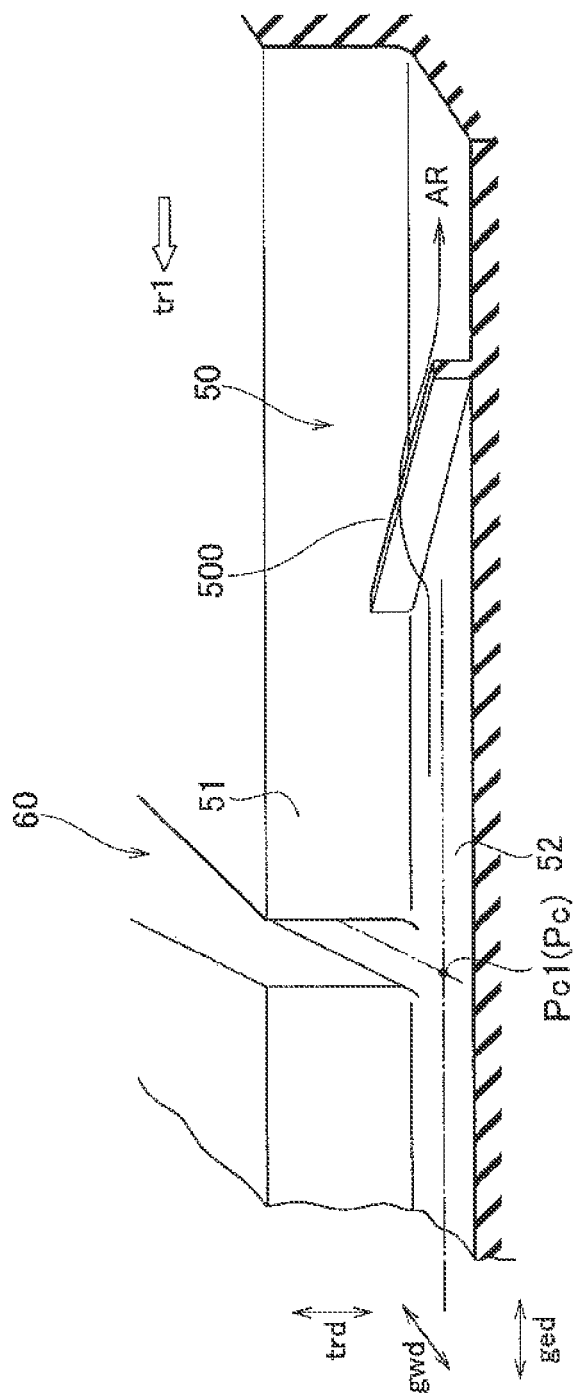
FIG. 3 is a partially-cutaway perspective view of a circumferential groove 50 of the tire 1 according to the first embodiment.
Figure 4:
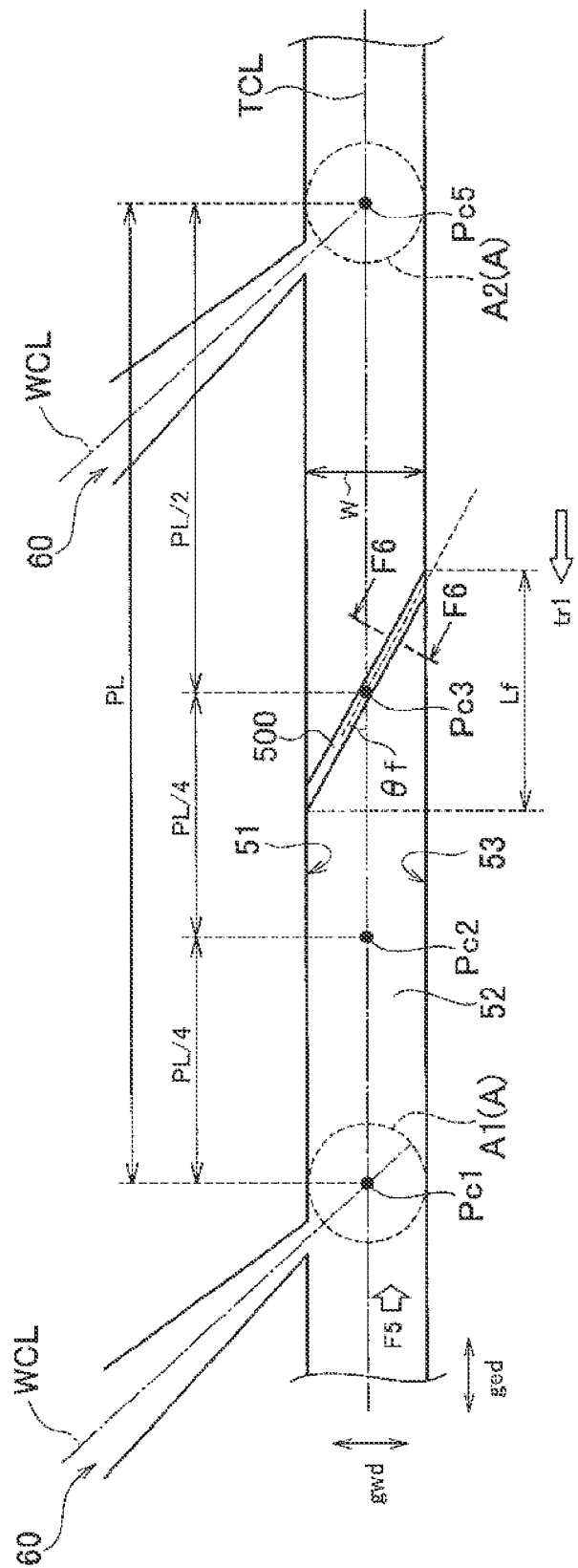
FIG. 4 is an enlarged perspective view illustrating an enlarged tread section 5 of the tire 1 according to the first embodiment.
Figure 5:
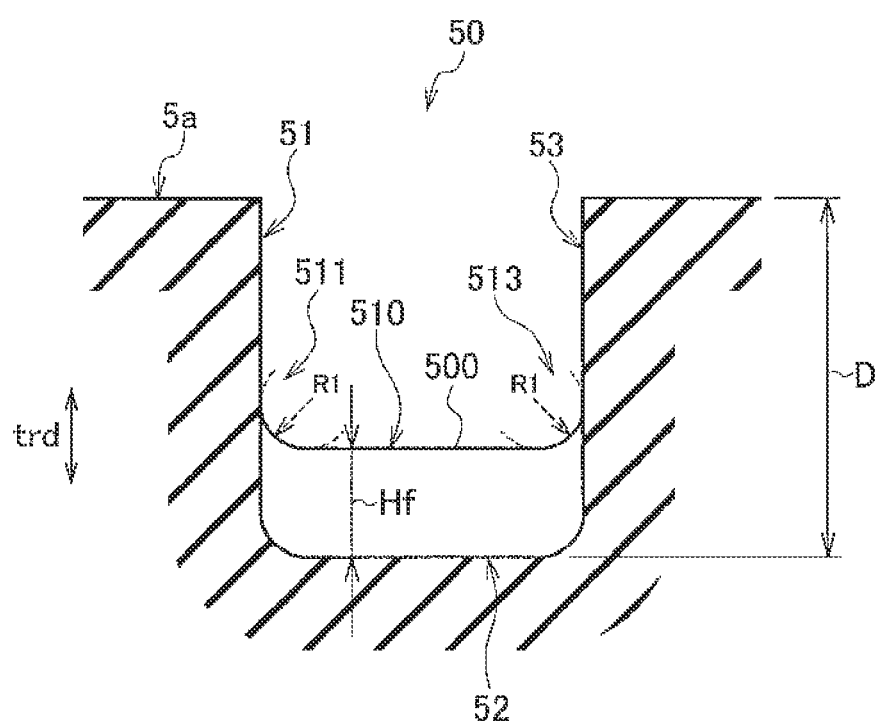
FIG. 5 is a view illustrating a shape of the circumferential groove 50 viewed from an F5 direction in FIG. 4.
Figure 6:
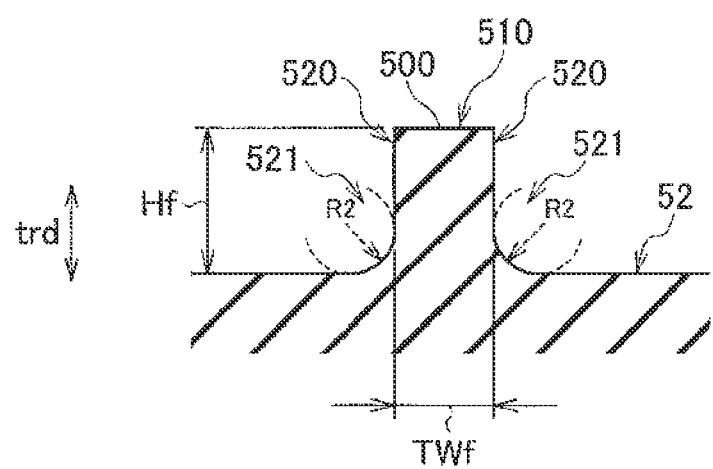
FIG. 6 is a cross sectional view of the circumferential groove 50 (projection part 500) taken along a line F6-F6 of FIG. 4.

FIG. 3 is a partially-cutaway perspective view of the circumferential groove 50. FIG. 4 illustrates a shape of the circumferential groove 50 in the tread face view (viewed from above the tread section 5). FIG. 5 illustrates a shape of the circumferential groove 50 viewed from an F5 direction in FIG. 4. To put it differently, FIG. 5 can be said to be a cross sectional view of the circumferential groove 50 taken along the tread width direction twd. FIG. 6 is a cross sectional view of the circumferential groove 50 (projection part 500) taken along a line F6-F6 in FIG. 4.

As illustrated in FIGS. 3 to 6, the groove bottom 52 of the circumferential groove 50 is provided with a projection part 500. In this embodiment, the projection part 500 extends from the one side wall 51 to the other side wall 53 that form the circumferential groove 50. In this embodiment, the projection part 500 is continued from the one side wall 51 to the other side wall 53. In other words, the projection part 500 is provided over the entire groove width W of the circumferential groove 50. In this embodiment, the side wall 51 and the side wall 53 are formed to extend in parallel with the tire circumferential direction tcd, and to be opposed to each other.

The projection part 500 is provided to jut from the groove bottom 52 outward in a tire radial direction trd. In this embodiment, the projection part 500 is a flat-plate-shaped rubber jutting out from the groove bottom 52, and is provided inclining with respect to the tire circumferential direction.

To be specific, as illustrated in FIG. 4, an angle θf formed by a circumferential groove inner line TCL and the projection part 500 is 10 degrees to 60 degrees, both inclusive. The angle θf is an angle formed by the extending direction of the projection part 500 and the circumferential groove inner line TCL passing through the inside of the circumferential groove 50 in the tread face view of the tire 1, and is an angle formed in a direction to the rotation direction of the tire 1. In other words, the angle θf is an angle formed in a retreating side of an air flow AR generated with rolling of the tire 1 in the rotation direction tr1. Incidentally, in this embodiment, the circumferential groove inner line TCL is described as a line passing through the widthwise center of the circumferential groove 50, but should not be limited to this. The circumferential groove inner line TCL may be a line passing through any portion inside the circumferential groove 50.

In this embodiment, an intersection Pc denotes a point where the circumferential groove inner line TCL passing through the inside of the circumferential groove 50 crosses a lug groove inner line WCL passing through the widthwise center of each lug groove 60 in the tread face view of the tire 1. In this embodiment, the lug groove inner line WCL is described as a line passing through the widthwise center of the lug groove 60, but should not be limited to this. The lug groove inner line WCL may be a line passing through any portion inside the lug groove 60.

Here, when the tire 1 rolls in the rotation direction tr1, a confluence area A is formed in a region near the intersection Pc. In the confluence area A, the air flowing through the circumferential groove 50 and the air flowing from the lug groove 60 meet each other. In this confluence area A, the air is likely to change into a turbulent flow, which encourages heat dissipation from the inside of the circumferential groove 50.

Moreover, in this embodiment, as illustrated in FIG. 4, a first intersection Pc1 denotes a point where the lug groove inner line WCL passing through the widthwise center of a certain lug groove 60 crosses the circumferential groove inner line TCL, and a second intersection Pc5 denotes a point where the lug groove inner line WCL passing through the widthwise center of another lug groove 60 next to the certain lug groove 60 in the tire circumferential direction tcd crosses the circumferential groove inner line TCL.

In the tire 1 according to this embodiment, the projection part 500 is provided between the first intersection Pc1 and the second intersection Pc5 next to the first intersection Pc1 in the tire circumferential direction tcd. In this embodiment, the position of the projection part 500 is determined based on its center in the tire circumferential direction tcd and in the tread width direction twd. Thus, in the tire 1 according to this embodiment, the center position of the projection part 500 is located between the first intersection Pc1 and the second intersection Pc5. Specifically, a range where the center position of the projection part 500 is provided is on a second intersection Pc5 side of the first intersection Pc1 and on a first intersection Pc1 side of the second intersection Pc5.

The second intersection Pc5 is located behind the first intersection Pc1 in the rotation direction tr1. Then, the projection part 500 is preferably provided on the second intersection Pc5 side of a point shifted by PL/4 from the first intersection Pc1, where PL denotes an interval between the first intersection Pc1 and the second intersection Pc5.

More specifically, it is preferable that the center position of the projection part 500 be located on the second intersection Pc5 side of the point shifted by PL/4 from the first intersection Pc1 toward the second intersection Pc5. The reason for this is as follows. Inside the circumferential groove 50, a central area between the first intersection Pc1 and the second intersection Pc5 tends to have a high temperature when the tire 1 rolls in the tire rotation direction. If the projection part 500 is provided on the second intersection Pc5 side of the point shifted by PL/4 from the first intersection Pc1, the projection part 500 can disturb the air passing through the central area within the whole inner region of the circumferential groove 50. In other words, the projection part 500 can further encourage heat dissipation from the inside of the circumferential groove 50.

Moreover, it is also preferable that the center position of the projection part 500 be located on the first intersection Pc1 side of the second intersection Pc5. Here, to put the interval PL differently, the interval PL can be said to be equal to the interval L between the lug grooves 60 in the tire circumferential direction tcd.

In addition, as illustrated in FIG. 5, the projection part 500 preferably satisfies a relationship of 0.03D<Hf≤0.4D, where Hf denotes a height of the projection part 500 from the groove bottom 52 and D denotes a depth from the tread face 5a to the groove bottom 52 (deepest portion) of the circumferential groove 50. Further, the groove bottom 52 is preferably flat at least in a range of 0.2W, where W denotes a groove width of the circumferential groove 50B. More specifically, in the central portion in the groove width W of the groove bottom 52 including the circumferential groove inner line TCL, the surface of the groove bottom 52 is flat and smooth with no irregularities.

As illustrated in FIGS. 5 and 6, the projection part 500 includes an upper face portion 510 on an outer side in the tire radial direction trd. The projection part 500 also includes side face portions 520 on one and the other sides in the tire circumferential direction tcd.

The upper face portion 510 includes a side wall joint portion 511 joined to the one side wall 51 of the circumferential groove 50 and a side wall joint portion 513 joined to the other side wall 53 of the circumferential groove 50.

In the tire 1 according to this embodiment, the cross sectional shape of each of the side wall joint portions 511, 513 in a cross section along the tread width direction twd is formed in an arc shape with a curvature radius R1. Then, the curvature radius R1 satisfies a relationship of 0.1TWf≤R1≤0.4TWf, where TWf denotes a width of the upper face portion 510 (hereinafter, referred to as a projection width). Here, the projection width TWf is a width in a direction orthogonal to the extending direction of the projection part 500.

As illustrated in FIG. 6, each of the side face portions 520 of the projection part 500 includes a groove bottom joint portion 521 joined to the groove bottom 52 of the circumferential groove 50.

In the tire 1 according to this embodiment, the cross sectional shape of each of the groove bottom joint portions 521 in a cross section along the width direction of the projection part 500 is formed in an arc shape with a curvature radius R2. Then, the curvature radius R2 satisfies a relationship of 0.1Hf≤R2≤Hf, where Hf denotes the height of the projection part 500 from the groove bottom 52.

Here, the projection height Hf is in a range of 5 to 15 mm, for example. The depth D is in a range of 40 to 120 mm, for example. The groove width W of the groove bottom 52 is in a range of 5 to 20 mm, for example. The projection width TWf is in a range of 0.5 to 10 mm, for example.

(3) Actions and Effects

In the tire 1 according to this embodiment, two or more circumferential grooves 50 extending in the tire circumferential direction tcd and multiple lug grooves 60 extending from the tread ends 5e in the tread width direction twd are formed. Each of the lug grooves 60 includes the opening portion 60a opened to the tread end 5e and the opening portion 60b opened to the circumferential groove 50. The lug groove 60 extends inclining with respect to the tread width direction twd, and the inclination angle of the lug groove 60 to the tread width direction twd is in the range of 0 degrees to 60 degrees, both inclusive.

Here, as illustrated in FIG. 2, when the tire 1 rolls in the rotation direction tr1, an air flow (relative wind) is generated relative to the rolling of the tire 1, and advances in a direction opposite to the rotation direction tr1. In the case where the lug groove 60 inclines, more specifically, the lug grooves 60 extend toward the same direction as the tire rotation direction while approaching the outermost side in the tread width direction twd (the lug grooves 60 on the left side in the case of the rotation direction tr1 in FIG. 2), the air having flowed into the lug grooves 60 from the outside easily flows along the wall surfaces of the lug grooves 60. The air having flowed into the lug grooves 60 from the outside hardly stagnates around the opening portion 60a of the lug grooves 60. This increases an amount of air flow passing through the inside of the lug groove 60s. Consequently, the heat dissipation from the inside of the lug grooves 60 is encouraged, so that the temperature of the tread section 5 can be lowered. Moreover, with rolling of the tire 1, the air flowing inside the lug grooves 60 can smoothly reach the circumferential groove 50 by traveling along the lug grooves 60.

On the other hand, in the case where the lug grooves 60 extend toward the direction opposite to the tire rotation direction while approaching the outermost side in the tread width direction twd (the lug grooves 60 on the right side in the case of the rotation direction tr1 in FIG. 2), the air having flowed into the lug grooves 60 from the outside flows along the wall surfaces of the lug grooves 60. Consequently, the heat dissipation from the inside of the lug grooves 60 is encouraged, so that the temperature of the tread section 5 can be lowered.

In addition, the air is encouraged to flow out from the lug grooves 60 to the outside in the tread width direction twd, and accordingly reduces the pressure inside the lug grooves 60, so that the amount of air flow getting into the lug grooves 60 from the circumferential groove 50 can be increased. This encourages heat dissipation from the inside of the circumferential grooves 50, so that the temperature of the tread section 5 can be lowered.

Moreover, in this embodiment, since the inclination angle θ of the lug grooves 60 is 60 degrees or less, the block stiffness of the land blocks 100 can be ensured. Consequently, this suppresses the deformation of the land blocks 100 during rolling of the tire 1, and therefore suppresses an increase in heat build-up in the tread section 5.

Moreover, in the tire 1 according to this embodiment, the groove bottoms 52 of the circumferential grooves 50 are provided with the projection parts 500. The projection parts 500 extend from the one side wall 51 to the other side wall 53 opposed to the one side wall 51, the side walls 51, 53 forming each of the circumferential grooves 50.

Here, the air reaching the circumferential groove 50 flows along the circumferential groove 50. As illustrated in FIGS. 7(a) and 7(b), the air flow AR1 along the side wall 51 of the circumferential groove 50 is stopped from flowing along the circumferential groove 50 because the projection part 500 stands in the advancing direction of the air flow, therefore advances while including with respect to the extending direction of the circumferential groove 50, and then climbs over the projection part 500. In this way, the air flow AR1 changes to a spiral flow (swirling flow). Since the air flow AR1 advances while involving surrounding air, the air flow AR1 is increased in air flow amount, and is also increased in speed. This encourages heat dissipation from the tread section 5.

Meanwhile, an air flow AR2 along the side wall 53 of the circumferential groove 50 advances in the extending direction of the projection part 500. Then, the air flow AR2 flows out of the circumferential groove 50 around the side wall 51 of the circumferential groove 50. The air that stores heat by passing through the circumferential groove 50 flows to the outside, which encourages heat dissipation from the tread section 5.

In the case of the lug groove 60 extending toward the direction opposite to the tire rotation direction while approaching the outermost side in the tread width direction twd (the lug groove 60 on the right side in the case of the rotation direction tr1 in FIG. 2), an air flow (relative wind) in a direction opposite to the rotation direction is generated with rolling of the tire 1 and advances along the inclination of the lug groove 60 inside the lug groove 60. As a result, the air is encouraged to flow out of the lug groove 60, and accordingly reduces the pressure inside the lug groove 60, so that the amount of air flow passing through the inside of the lug groove 60 can be increased. This encourages heat dissipation from the inside of the lug groove 60.

Moreover, in the above case, the air flowing through the circumferential groove 50 flows into the lug grooves 60 more easily. The air that stores heat by passing through the inside of the circumferential groove 50 flows to the outside via the lug grooves 60, and thereby encourages heat dissipation from the tread section 5.

In the tire 1 according to this embodiment, a projection part 500 is provided between the first intersection Pc1 and the second intersection Pc5 next to the first intersection Pc1 in the tire circumferential direction tcd.

Here, when the tire 1 rolls in the rotation direction tr1, the air is likely to change into a turbulent flow in the confluence area A near the first intersection Pc1. In addition, the air flows inside the circumferential groove 50 in the direction opposite to the rotation direction tr1 and forms an air stagnation layer (boundary layer) on the surface of the circumferential groove 50 (the surfaces of the side wall 51, the groove bottom 52 and the side wall 53) after advancing by a certain distance. In particular, as the distance from the first intersection Pc1 in the direction opposite to the rotation direction tr1 increases, the air stagnation layer is increased in thickness, and heat dissipation from the surface of the circumferential groove 50 is inhibited more.

In the tire 1 according to this embodiment, the projection part 500 is provided between the first intersection Pc1 and the second intersection Pc5, and disturbs the air stagnation layer, so that the heat dissipation can be encouraged. That is to say, the heat dissipation from the tread section 5 is encouraged.

In this embodiment, the other intersection Pc5 is located behind the certain intersection Pc1 in the rotation direction tr1. Then, the projection part 500 is preferably provided on the other intersection Pc5 side of the point shifted by PL/4 from the first intersection Pc1, where PL denotes the interval between the certain intersection Pc1 and the other intersection Pc5. In this case, the air stagnation layer formed on the surface of the circumferential groove 50 can be disturbed more certainly. In other words, the heat dissipation from the inside of the circumferential groove 50 can be further encouraged.

Note that, in the foregoing embodiment, it is preferable that the projection part 500 be provided on a forward side in the tire rotation direction from a point shifted by 3PL/4 from the first intersection. Also in this case, the air stagnation layer formed on the surface of the circumferential groove 50 can be disturbed more certainly. In other words, the heat dissipation from the inside of the circumferential groove 50 can be further encouraged.

In this embodiment, the projection part 500 includes the upper face portion 510 and the side face portions 520. The upper face portion 510 includes the side wall joint portion 511 joined to the one side wall 51 of the circumferential groove 50 and the side wall joint portion 513 joined to the other side wall 53 of the circumferential groove 50.

Moreover, in the tire 1 according to this embodiment, the cross sectional shape of each of the side wall joint portions 511, 513 in the cross section along the tread width direction twd is formed in the arc shape with the curvature radius R1. Then, the curvature radius R1 satisfies the relationship of $0.1\text{TWf} \leq R1 \leq 0.4\text{TWf}$, where the projection width TWf denotes the width of the upper face portion 510.

In the projection part 500, if the curvature radius R1 of the side wall joint portions 511, 513 is smaller than 0.1TWf, a crack is likely to occur at the side wall joint portions 511, 513. On the other hand, if the curvature radius R1 of the side wall joint portions 511, 513 is larger than 0.4TWf, the upper face portion 510 has such a small flat area that the air flowing inside the circumferential groove 50 is less likely to change into a turbulent flow. Consequently, the heat dissipation from the inside of the circumferential groove 50 is inhibited.

Each of the side face portions 520 of the projection part 500 includes the groove bottom joint portion 521 joined to the groove bottom 52 of the circumferential groove 50. In the tire 1 according to this embodiment, the cross sectional shape of the groove bottom joint portion 521 in the cross section along the width direction of the projection part 500 is formed in the arc shape with the curvature radius R2. Then, the curvature radius R2 satisfies the relationship of $0.1\text{Hf} \leq R2 \leq \text{Hf}$, where Hf denotes the height of the projection part 500 from the groove bottom 52. Here, the width direction of the projection part 500 is a direction orthogonal to the extending direction of the projection part 500.

In the projection part 500, if the curvature radius R2 of the groove bottom joint portions 521 is smaller than 0.1Hf, the air flowing inside the circumferential groove 50 is likely to stagnate at the groove bottom joint portions 521, and accordingly the heat dissipation from the inside of the circumferential groove 50 is inhibited. On the other hand, if the curvature radius R2 of the groove bottom joint portions 521 is larger than Hf, the air flowing inside the circumferential groove 50 is less likely to be disturbed, and accordingly is more likely to form an air stagnation layer on the surface of the circumferential groove 50.

In addition, the angle θf formed by the extending direction of the projection part 500 and the circumferential groove inner line TCL is preferably 10 degrees to 60 degrees, both inclusive. When the angle θf is 10 degrees or more, an acute angle area formed by the projection part 500 and the side wall 51 (or the side wall 53) can inhibit deceleration of the air flow AR flowing inside the circumferential groove 50. In addition, the projection parts 500 can be easily formed in the circumferential groove 50 in the manufacturing of the tire 1. On the other hand, if the angle θf is 60 degrees or less, the air flow AR2 flowing inside the circumferential groove 50 can be efficiently changed into a spiral flow. This increases an amount of wind passing over the groove bottom 52, and results in efficient heat dissipation from the tread section 5.

Moreover, preferably, the height Hf of the projection part 500 and the depth D of the circumferential groove 50 satisfy the relationship of $0.03D < Hf \leq 0.4D$. If the relationship of $0.03D < Hf$ is satisfied, the height Hf of the projection part 500 is the predetermined height or higher, and therefore the air flow AR2 flowing inside the circumferential groove 50 can be efficiently changed into a spiral flow. This increases an amount of wind passing over the groove bottom 52, and results in efficient heat dissipation from the tread section 5. If the relationship of $Hf \leq 0.4D$ is satisfied, the air flow AR1 having changed to the spiral flow more easily reaches the groove bottom 52. This results in efficient heat dissipation from the groove bottom 52.

Further, the groove bottom 52 of the circumferential groove 50 is flat at least in a range of 0.2W within the entire groove width W of the circumferential groove 50. In this case, the air flow AR passing over the groove bottom 52 is not blocked. Thus, the temperature rise in the tread section 5 can be more efficiently suppressed.

Further, the projection part 500 is continued from the one side wall 51 to the other side wall 53. The projection part 500 thus formed enables the air flow AR1 advancing along the projection part 500 to climb over the projection part 500 around the side wall 53, and thereby allows the air flow AR1 to change into a spiral flow (swirling flow) efficiency. Thus, the heat can be efficiently dissipated from the tread section 5.

In the tire 1 according to this embodiment, the number of lug grooves 60 formed in the tread section 5 on one side of the tire center line CL in the tread width direction twd is preferably in a range of 20 to 80, both inclusive. In the case of a tire having more than 80 lug grooves 60 formed therein, the air stagnation layer does not become very large on the side walls and the groove bottom of the circumferential groove 50 because there are many points where the air flows into the circumferential groove 50 from the lug grooves 60. For this reason, the number of lug grooves 60 formed is preferably within the above range in order that the projection parts 500 can encourage heat dissipation by generating turbulent flows.

It should be noted that more remarkable effects can be obtained if the tire 1 according to this embodiment is applied to heavy duty pneumatic tires. Thus, it is preferable to apply the tire 1 according to this embodiment to heavy duty pneumatic tires.

Modified Examples (1) Modified Example 1

Next, a modified example 1 of the tire 1 according to the first embodiment is described with attention focused on its difference from the first embodiment. In a tire 1A according to this modified example, multiple projection parts 500 are provided on a groove bottom 52 of each circumferential groove 50.

Figure 8:
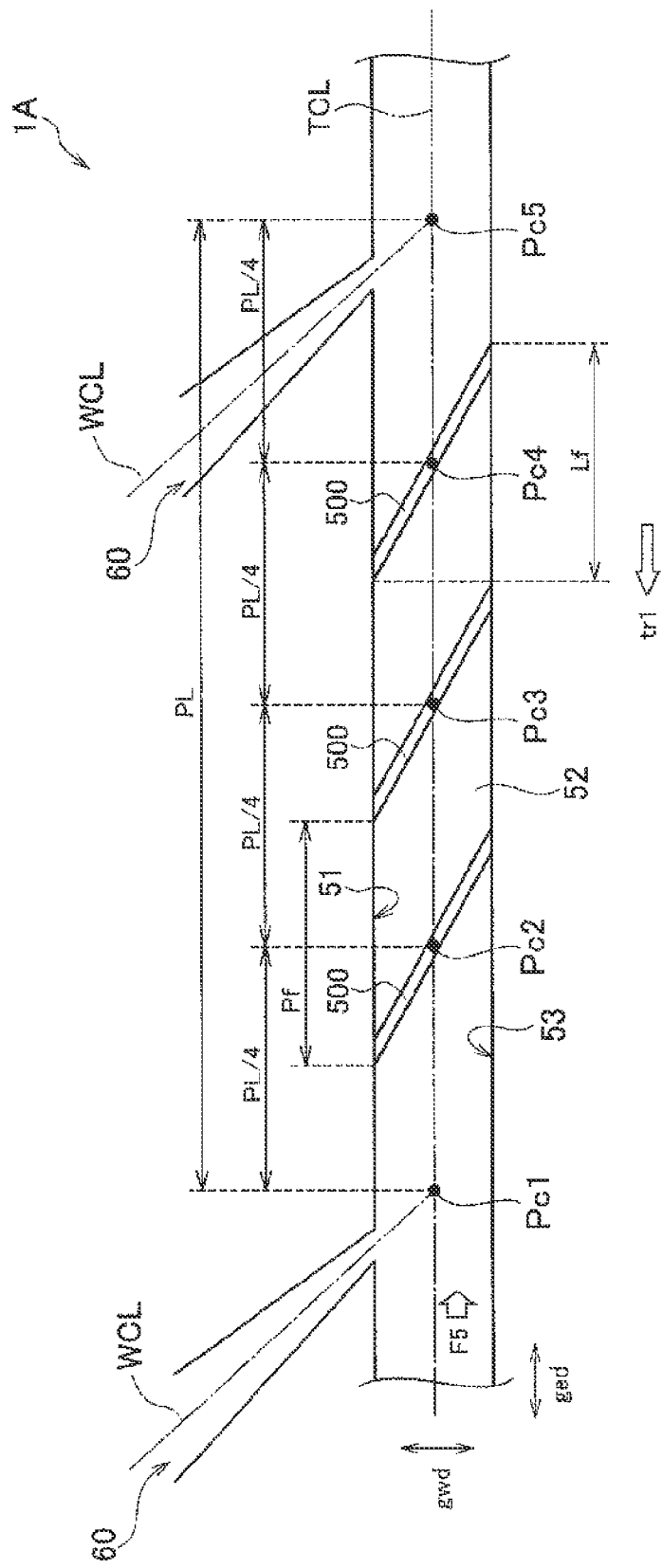
FIG. 8 is an enlarged perspective view illustrating an enlarged tread section 5 of a tire according to a modified example of the first embodiment.

To be specific, in the tire 1A according to this embodiment, projection parts 500 are provided at intervals Pf of PL/4 between the first intersection Pc1 and the second intersection Pc5 as illustrated in FIG. 8. Note that the interval Pf between the projection parts 500 is not limited to this.

For example, in the tread face view of the tire 1A, the projection parts 500 provided in the circumferential groove 50 preferably satisfy a relationship of 0.75Lf≤Pf≤10Lf, where Lf denotes a length of the projection parts 500 along the circumferential groove inner line TCL, and Pf denotes a predetermined interval. The reason for this is as follows. Specifically, if the projection parts 500 satisfy the relationship of 0.75Lf≤Pf, the number of the projection parts 500 provided in the circumferential groove 50 is not so large that deceleration of the air flowing inside the circumferential groove 50 can be inhibited. If the projection parts 500 satisfy the relationship of Pf≤10.0Lf, the number of the projection parts 500 provided in the circumferential groove 50 is not so small that the air flow AR1 can change into a spiral flow (swirling flow) efficiently.

The length Lf is a length from one end to the other end of the projection part 500 in the extending direction of the circumferential groove 50 (the tire circumferential direction in this embodiment). The interval Pf may be a distance from one end of a projection part 500 to one end of another projection part 500, or may be a distance between the centers of the projection parts 500 where the projection parts 500 cross the circumferential groove inner line TCL.

In the tire 1A according to this modified example, the multiple projection parts 500 formed on the groove bottom 52 of the circumferential groove 50 more inhibit a growth of the air stagnation layer inside circumferential groove 50, and accordingly further encourage heat dissipation from the inside of the circumferential groove 50.

(2) Modified Example 2

Next, a modified example 2 of the tire 1 according to the first embodiment is described with attention focused on its difference from the first embodiment. In a tire 1B according to this modified example, when viewed from the tire center line CL to the respective tread ends 5e, lug grooves 60 formed on one side in the tread width direction twd and lug grooves 60 formed on the other side in the tread width direction twd are the same in the directionality (directional pattern) with respect to the rotation direction tr1.

Figure 9:
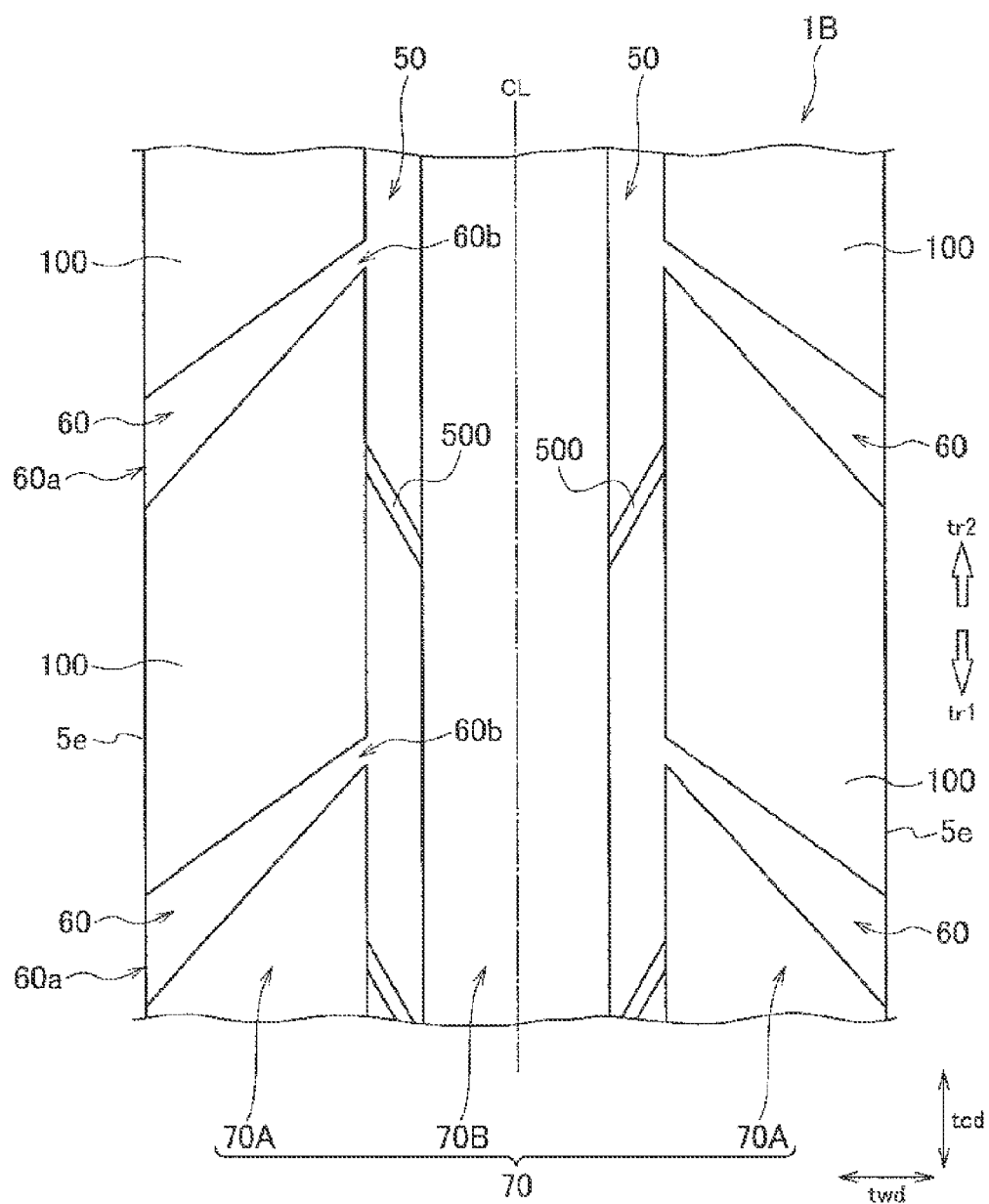
FIG. 9 is a development view of a tread pattern of the tire according to the modified example of the first embodiment.

To be specific, as illustrated in FIG. 9, in the lug grooves 60 formed on the one side (left side) in the tread width direction twd, the direction from the opening portion 60b to the opening portion 60a extends in a direction closer to the rotation direction tr1 than to the rotation direction tr2. Similarly, in the lug grooves 60 formed on the other side (right side) in the tread width direction twd, the direction from the opening portion 60b to the opening portion 60a extends in a direction closer to the rotation direction tr1 than to the rotation direction tr2.

In the tire 1B according to this modified example, when the tire 1B rolls in the rotation direction tr1, an air flow (relative wind) is generated relative to the rolling of the tire 1B, and advances in the direction opposite to the rotation direction tr1. This air flows into both the opening portions 60a of the lug grooves 60 formed on one (left side) of the outer sides of the tire center line CL in the tread width direction twd, and the opening portions 60a of the lug grooves 60 formed on the other outer side (right side). This increases the amounts of air flow passing through the inside of the lug grooves 60, 60 on both sides. Consequently, the heat dissipation from the inside of the lug grooves 60, 60 is encouraged, so that the temperature of the tread section 5 can be lowered. Moreover, with rolling of the tire 1B, the air flowing inside the lug grooves 60, 60 flows into the circumferential grooves 50, 50 after advancing along the lug grooves 60, 60, so that the heat dissipation from the inside of the circumferential grooves 50 is further encouraged.

[Comparative Evaluation]

The following measurements were made to ascertain the effects of tires according to the present invention. It should be noted that the present invention is not limited to Examples presented below.

First of all, tires for mining were prepared as test tires. Then, a measurement was made on the temperature in the tread section of each of tires in Comparative examples 1 to 5 and Example 1 to 4 described below.

As Comparative examples 1 to 4, tires provided with no projection parts in circumferential grooves were used. Here, the tires with the lug grooves having no directionality with respect to the rotation direction tr1 were used as Comparative examples 1 to 3 and Comparative example 5. The tire with the lug grooves having directionality with respect to the rotation direction tr1 was used as Comparative example 4.

In the tire used as Comparative example 1, the lug grooves have an inclination angle θ of 0 degrees. In the tire used as Comparative example 2, the lug grooves have an inclination angle θ of 15 degrees. In the tire used as Comparative example 3, the lug grooves have an inclination angle θ of 45 degrees. In the tire used as Comparative example 4, the lug grooves have an inclination angle θ of 45 degrees. In the tire used as Comparative example 5, the projection parts are formed in the circumferential grooves and the lug grooves have an inclination angle θ of 45 degrees. Here, in Comparative example 5, the positions of the projection parts are located on intersections.

As Examples 1 to 4, tires provided with projection parts in circumferential grooves were used. Here, the tires with the lug grooves having no directionality with respect to the rotation direction tr1 were used as Examples 1 to 3. The tire with the lug grooves having directionality with respect to the rotation direction tr1 was used as Example 4.

In the tire used as Example 1, the projection parts are formed in the circumferential grooves and the lug grooves have an inclination angle θ of 45 degrees. In Example 1, the position of each projection part is located at a distance PL/4 from the first intersection toward the second intersection.

In the tire used as Example 2, the projection parts are formed in the circumferential grooves and the lug grooves have an inclination angle θ of 15 degrees. In Example 2, the position of each projection part is located at a distance PL/2 from the first intersection toward the second intersection.

In the tire used as Example 3, the projection parts are formed in the circumferential grooves and the lug grooves have an inclination angle θ of 45 degrees. In Example 3, the position of each projection part is located at a distance PL/2 from the first intersection toward the second intersection.

In the tire used as Example 4, the projection parts are formed in the circumferential grooves and the lug grooves have an inclination angle θ of 45 degrees. In Example 4, the position of each projection part is located at a distance PL/2 from the first intersection toward the second intersection. In addition, in the tire used in Example 4, the lug grooves formed on one side in the tread width direction twd and the lug grooves formed on the other side in the tread width direction twd are the same in the directionality (directional pattern) with respect to the rotation direction.

Figure 10:
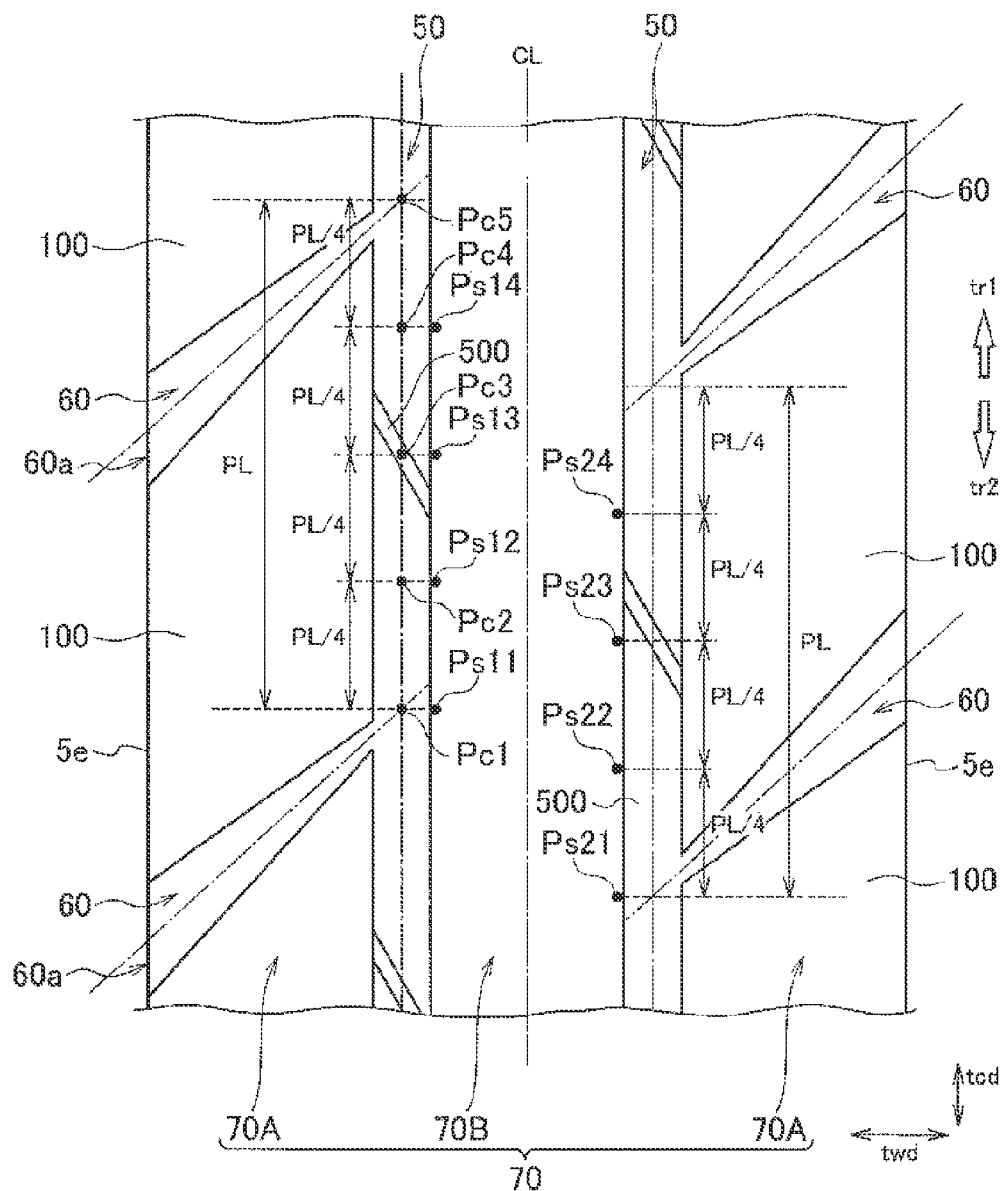
FIG. 10 is a view for explaining measurement points in comparative evaluation.

The test was conducted under the following conditions.
<Test Conditions>
Tire Size: Tire of 59/80R63
Rim Width: 36 inch
Set Internal Pressure: 600 kPa
Set Load: 82.5 ton
Set Speed: 8 km/h
Test Method: Temperatures at tread widthwise ends of the circumferential land section 70B were measured with the tire rolling on an indoor drum test machine. As illustrated in FIG. 10, the measurement was conducted at 8 measurement points, in total, which are points Ps11 to Ps14 on one side (left side) of the tire center line CL, and points Ps21 to Ps24 on the other side (right side) of the tire center line CL. Here, the points Ps11 to Ps14 represent distances from an intersection between a lug groove 60 and the circumferential groove 50 on the left side illustrated in FIG. 10, and the points Ps21 to Ps24 represent distances from an intersection between a lug groove 60 and the circumferential groove 50 on the right side illustrated in FIG. 10. Given that PL denotes a distance between intersections, the points Ps11 and Ps21 each represent the same position as the intersection in the tire circumferential direction tcd, the points Ps12 and Ps22 each represent the position away from the intersection by ¼×PL in the tire circumferential direction tcd, the points Ps13 and Ps23 each represent the position away from the intersection by ½×PL in the tire circumferential direction tcd, and the points Ps14 and Ps24 each represent the position away from the intersection by ¾×PL in the tire circumferential direction tcd.

Table 1 and Table 2 show the measurement results.

TABLE 1

| | Unit | Comparative Example 1 | Comparative Example 2 | Comparative Example 3 | Comparative Example 4 | Comparative Example 5 | Example 1 | Example 2 | Example 3 | Example 4 |
|---|---|---|---|---|---|---|---|---|---|---|
| Lug Groove Angle | Degree | 0 | 15 | 45 | 45 | 45 | 45 | 15 | 45 | 45 |
| Directional Pattern | — | No | No | No | Directional | No | No | No | No | Directional |
| Number of Projections (Between Intersections) | — | 0 | 0 | 0 | 0 | 1 | 1 | 1 | 1 | 1 |
| Position of Projection (Distance from Intersection) | — | — | — | — | — | 0 | PL/4 | PL/2 | PL/2 | PL/2 |
| Temperature of Point Ps11 (Left) | °C. | 80 | 79 | 77 | 75 | 76 | 77 | 79 | 77 | 75 |
| Temperature of Point Ps12 (Left) | °C. | 82 | 81 | 79 | 77 | 79 | 78 | 81 | 79 | 77 |
| Temperature of Point Ps13 (Left) | °C. | 85 | 84 | 83 | 82 | 83 | 80 | 83 | 82 | 80 |
| Temperature of Point Ps14 (Left) | °C. | 90 | 89 | 88 | 86 | 88 | 86 | 86 | 84 | 82 |
| Temperature of Point Ps21 (Right) | °C. | 80 | 79 | 78 | 75 | 78 | 78 | 79 | 78 | 75 |
| Temperature of Point Ps22 (Right) | °C. | 82 | 81 | 80 | 77 | 80 | 79 | 82 | 80 | 77 |
| Temperature of Point Ps23 (Right) | °C. | 85 | 84 | 84 | 82 | 84 | 81 | 84 | 83 | 80 |
| Temperature of Point Ps24 (Right) | °C. | 90 | 90 | 89 | 86 | 89 | 87 | 87 | 85 | 82 |
| CP (Cornering Power) | % | 100 | 99.5 | 99 | 99 | 99 | 99 | 99.5 | 99 | 99 |

TABLE 2

|  | Unit | Example 5 | Example 6 | Example 7 |
|---|---|---|---|---|
| Lug Groove Angle | Degree | 15 | 45 | 45 |
| Directional Pattern | — | No | No | Directional |
| Number of Projections (Between Intersections) | — | 2 | 2 | 2 |
| Position of Projection (Distance from Intersection) | — | ½×PL and ¾×PL | ½×PL and ¾×PL | ½×PL and ¾×PL |
| Temperature of Point Ps11 (Left) | ° C. | 78 | 76 | 74 |
| Temperature of Point Ps12 (Left) | ° C. | 81 | 79 | 77 |
| Temperature of Point Ps13 (Left) | ° C. | 83 | 82 | 80 |
| Temperature of Point Ps14 (Left) | ° C. | 85 | 83 | 81 |
| Temperature of Point Ps21 (Right) | ° C. | 78 | 77 | 74 |
| Temperature of Point Ps22 (Right) | ° C. | 81 | 80 | 77 |
| Temperature of Point Ps23 (Right) | ° C. | 83 | 83 | 80 |
| Temperature of Point Ps24 (Right) | ° C. | 86 | 84 | 81 |
| CP (Cornering Power) | % | 99.5 | 99 | 99 |

As illustrated in Table 1 and Table 2, the tires in Examples 1 to 7 suppressed an overall temperature rise of the tire, as compared with the tires in Comparative examples 1 to 5 having the same lug groove angle as Examples 1 to 7. In particular, the tire in Example 1 suppressed the overall temperature rise of the tire, as compared with the tire in Comparative example 5. This proves that a tire in which projection parts are each provided at a distance PL/4 from the intersection can produce a higher effect in suppression of a temperature rise than a tire in which projection parts are each provided on the intersection.

Moreover, the tires in Examples 5 to 7 obtained the temperature rise suppression effect at a level equal to or higher than in Examples 2 to 4. The temperature rise at the points Ps14 and Ps24, in particular, was suppressed.

Other Embodiments

Although the details of the present invention are disclosed by using the embodiment of the present invention, it should not be understood that the description and the drawings constituting part of this disclosure limit the present invention. The present invention includes various embodiments that are not described herein.

The following embodiments and the foregoing embodiment can be combined as needed without impairing the effects of the invention.

The projection parts 500 have a flat plate shape in the foregoing embodiment, but may have other shapes. In the tread face view, the projection parts 500 may have a wave form shape or a shape that is thick near the circumferential groove inner line TCL and becomes thinner toward the side wall 51 and the side wall 53 (or vice versa).

Moreover, the angle θf, the groove depth D, and the groove width W do not always have to satisfy the conditions specified in the foregoing embodiment.

Although the circumferential grooves 50 extend in parallel with the tire circumferential direction tcd in the foregoing embodiment, the present invention is not limited to this. The circumferential grooves 50 are not necessarily parallel to the tire circumferential direction tcd. For example, each circumferential groove 50 does not have to be parallel to the tire circumferential direction tcd as long as an angle formed by the circumferential groove 50 and the tire center line CL is 45 degrees or less. In addition, the circumferential groove 50 is not necessarily linear, but may be curved outward in the tread width direction twd or be in a zigzag form, for example. In the case of the circumferential groove 50 in the zigzag form, the circumferential groove 50 is preferably formed in such a form as not to decelerate air flowing inside the circumferential groove 50.

All the lug grooves 60 are formed at the same angle to the tire circumferential direction tcd, but may be formed at different angles. In one tire, the lug grooves 60 do not necessarily have to be at the same inclination angle θ. The inclination angle θ of the lug grooves 60 may vary between the lug grooves 60 located on one end side in the tread width direction twd and the lug grooves 60 located on the other end side in the tread width direction twd. In addition, the inclination angle θ of the lug grooves 60 may vary among the lug grooves 60 located on one end side in the tread width direction twd.

The tire 1 according to this embodiment can produce remarkable effects if applied to so-called extra-large tires, but may be applied to general tires.

The tire according to the present invention may be a pneumatic tire or a solid tire filled with rubber. Alternatively, the tire may be a tire filled with a gas other than air, such as nitrogen or a rare gas of Argon or the like.

As described above, the present invention includes various embodiments that are not described herein. Therefore, the technical scope of the present invention is determined based on only subject matters in CLAIMS that can be properly derived from the above description.

The content of Japanese Patent Application No. 2012-150945 (filed on Jul. 4, 2012) is wholly incorporated by reference into this specification.

INDUSTRIAL APPLICABILITY

Provided with the projection part between the first intersection and the second intersection, the tire according to the features of the present invention is able to encourage the heat dissipation by disturbing the air stagnation layers inside the circumferential grooves, as compared with tires provided with no projection part between the first intersection and the second intersection. That is to say, the tire encourages the heat dissipation from the inside of the circumferential grooves, and together can encourage the heat dissipation in the tread section through the heat dissipation from the inside of the circumferential grooves. Hence, according to the tire having the features of the present invention, it is possible to provide a tire that is capable of effectively suppressing a temperature rise in a tread section during driving of a vehicle.

The invention claimed is:
1. A tire comprising:
   a tread section including a circumferential groove formed to extend in a tire circumferential direction, and a lug groove formed to have an opening portion at a tread end which is an outer-side end of the tread section and to extend in a tread width direction from the tread end to the circumferential groove; and
   a projection part provided on a groove bottom of the circumferential groove, wherein
   the projection part extends from one of side walls forming the circumferential groove to the other side wall opposed to the one side wall, a plurality of the lug grooves are formed at a predetermined interval in the tire circumferential direction, given that an intersection is a point where a circumferential groove inner line passing through an inside of the circumferential groove crosses a lug groove inner line passing through an inside of each of the lug grooves in a tread face view of the tire, the projection part is provided between a first intersection and a second intersection next to the first intersection in the tire circumferential direction, the projection part includes an upper face portion having a side wall joint portion joined to the one side wall of the circumferential groove, a cross sectional shape of the side wall joint portion in a cross section along the tread width direction is formed in an arc shape having a curvature radius R1, and the curvature radius R1 satisfies a relationship of $0.1TWf \leq R1 \leq 0.4TWf$, where TWf denotes a width of the upper face portion.

2. The tire according to claim 1, wherein
the circumferential groove is formed at a position shifted by TW/8 from a tire center line outward in the tread width direction, where TW denotes a width of the tread section in the tread width direction.

3. The tire according to claim 1, wherein
the lug grooves each extend in the tread face view of the tire, and
an angle of each of the lug grooves with respect to the tread width direction in the tread face view of the tire is 0 degrees to 60 degrees, both inclusive.

4. The tire according to claim 1, wherein
the lug grooves are formed on one and the other sides of a tire center line in the tread width direction, and
the lug grooves formed on the one side in the tread width direction and the lug grooves formed on the other side in the tread width direction are same in directionality with respect to the tire rotation direction when viewed from the tire center line to the respective tread ends.

5. The tire according to claim 1, wherein
the lug grooves are formed on one and the other sides of a tire center line in the tread width direction, and
the lug grooves formed on the one side in the tread width direction and the lug grooves formed on the other side in the tread width direction different in directionality with respect to the tire rotation direction when viewed from the tire center line to the respective tread ends.

6. A tire comprising:
a tread section including a circumferential groove formed to extend in a tire circumferential direction, and a lug groove formed to have an opening portion at a tread end which is an outer-side end of the tread section and to extend in a tread width direction from the tread end to the circumferential groove; and a projection part provided on a groove bottom of the circumferential groove, wherein the projection part extends from one of side walls forming the circumferential groove to the other side wall opposed to the one side wall, a plurality of the lug grooves are formed at a predetermined interval in the tire circumferential direction, given that an intersection is a point where a circumferential groove inner line passing through an inside of the circumferential groove crosses a lug groove inner line passing through an inside of each of the lug grooves in a tread face view of the tire, the projection part is provided between a first intersection and a second intersection next to the first intersection in the tire circumferential direction, the projection part includes side face portions having groove bottom joint portions joined to the groove bottom of the circumferential groove, a cross sectional shape of each of the groove bottom joint portions in a cross section along a width direction of the projection part is formed in an arc shape having a curvature radius R2, and the curvature radius R2 satisfies a relationship of $0.1Hf \leq R2 \leq Hf$, where Hf denotes a height of the projection part from the groove bottom.

7. The tire according to claim 1, wherein
a plurality of the projection parts are provided between the first intersection and the second intersection.

8. The tire according to claim 1, wherein
the number of the lug grooves formed in the tread section on one side of a tire center line in the tread width direction is 20 to 80, both inclusive.

9. The tire according to claim 1, wherein
the projection part is provided inclining with respect to the tire circumferential direction.

10. The tire according to claim 1, wherein
the second intersection is located behind the first intersection in a tire rotation direction, and
the projection part is provided on the second intersection side of a point shifted by PL/4 from the first intersection, where PL denotes an interval between the first intersection and the second intersection.

11. The tire according to claim 1, wherein
the projection part is provided on a forward side, in a tire rotation direction, of a point shifted by 3PL/4 from the first intersection.

* * * * *